US008749560B2

(12) United States Patent
Ording

(10) Patent No.: US 8,749,560 B2
(45) Date of Patent: Jun. 10, 2014

(54) IMAGE MOTION BLURRING

(75) Inventor: Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 197 days.

(21) Appl. No.: 13/475,888

(22) Filed: May 18, 2012

(65) Prior Publication Data

US 2012/0293538 A1 Nov. 22, 2012

Related U.S. Application Data

(63) Continuation of application No. 13/251,020, filed on Sep. 30, 2011, now abandoned.

(60) Provisional application No. 61/394,722, filed on Oct. 19, 2010.

(51) Int. Cl.
*G06T 13/00* (2011.01)
*G09G 5/02* (2006.01)

(52) U.S. Cl.
USPC ............ 345/475; 345/473; 345/474; 345/592

(58) Field of Classification Search
CPC ......... G06T 13/00; G06T 13/20; G06T 13/40; G06T 13/60; G06T 13/80; G06T 15/503; G09G 2340/10; A63F 2300/66; A63F 2300/6607
USPC .......................................... 345/473–475, 592
See application file for complete search history.

(56) References Cited

U.S. PATENT DOCUMENTS

| 6,956,576 | B1* | 10/2005 | Deering et al. ............... 345/475 |
| 7,084,875 | B2* | 8/2006 | Plante ........................... 345/473 |
| 7,348,985 | B2 | 3/2008 | Sayre et al. |
| 7,382,373 | B2* | 6/2008 | Baxter et al. .................. 345/473 |
| 7,616,220 | B2 | 11/2009 | Baxter |
| 2006/0022975 | A1* | 2/2006 | Bredow et al. ................ 345/422 |
| 2009/0189912 | A1 | 7/2009 | Holtman |

OTHER PUBLICATIONS

Matthias M. Wloka, Time-Critical Graphics, 1993, Dissertation, Brown University, Providence, Rhode Island, CS-93-50, pp. 1-29.*

* cited by examiner

*Primary Examiner* — Xiao Wu
*Assistant Examiner* — Michael J Cobb
(74) *Attorney, Agent, or Firm* — Fish & Richardson P.C.

(57) ABSTRACT

The disclosed systems and methods make the motion of an object in an animation appear smooth by blending a number of subframes of visually adjusted images of the object for each frame of the animation. A request to animate an object along a motion path can be received by a graphics processing system of a device, where the motion path traverses at least a portion of a user interface presented on a display of the device. For each frame of the animation, the graphics processing system blends N subframes of visually adjusted images of the object to create a final blurred image which is rendered on the display. The graphics processing system can determine whether there is more processing time to perform additional blending of subframes prior to rendering a final frame for display, and then blending more subframes of images prior to rendering the final frame for display.

11 Claims, 6 Drawing Sheets

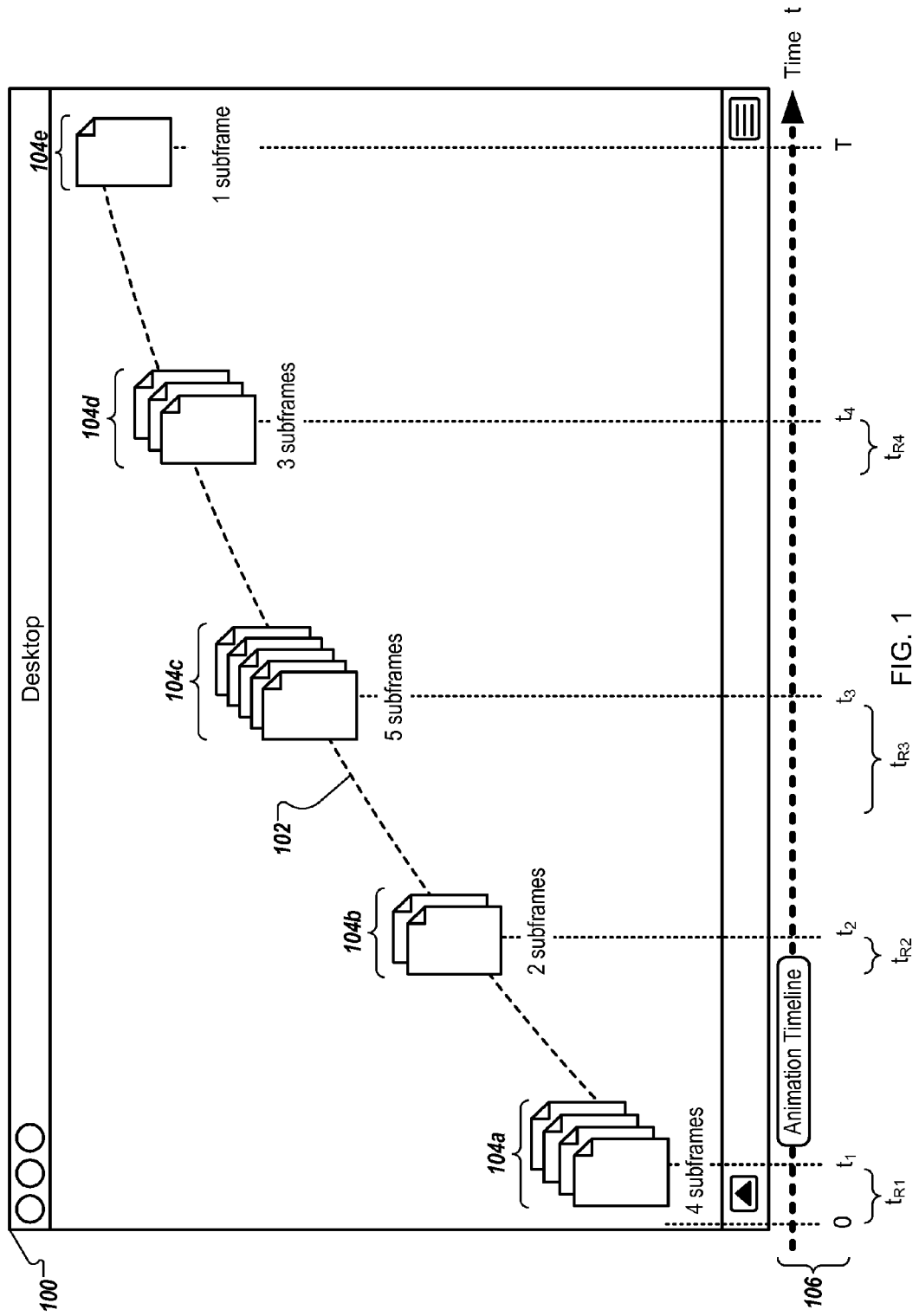

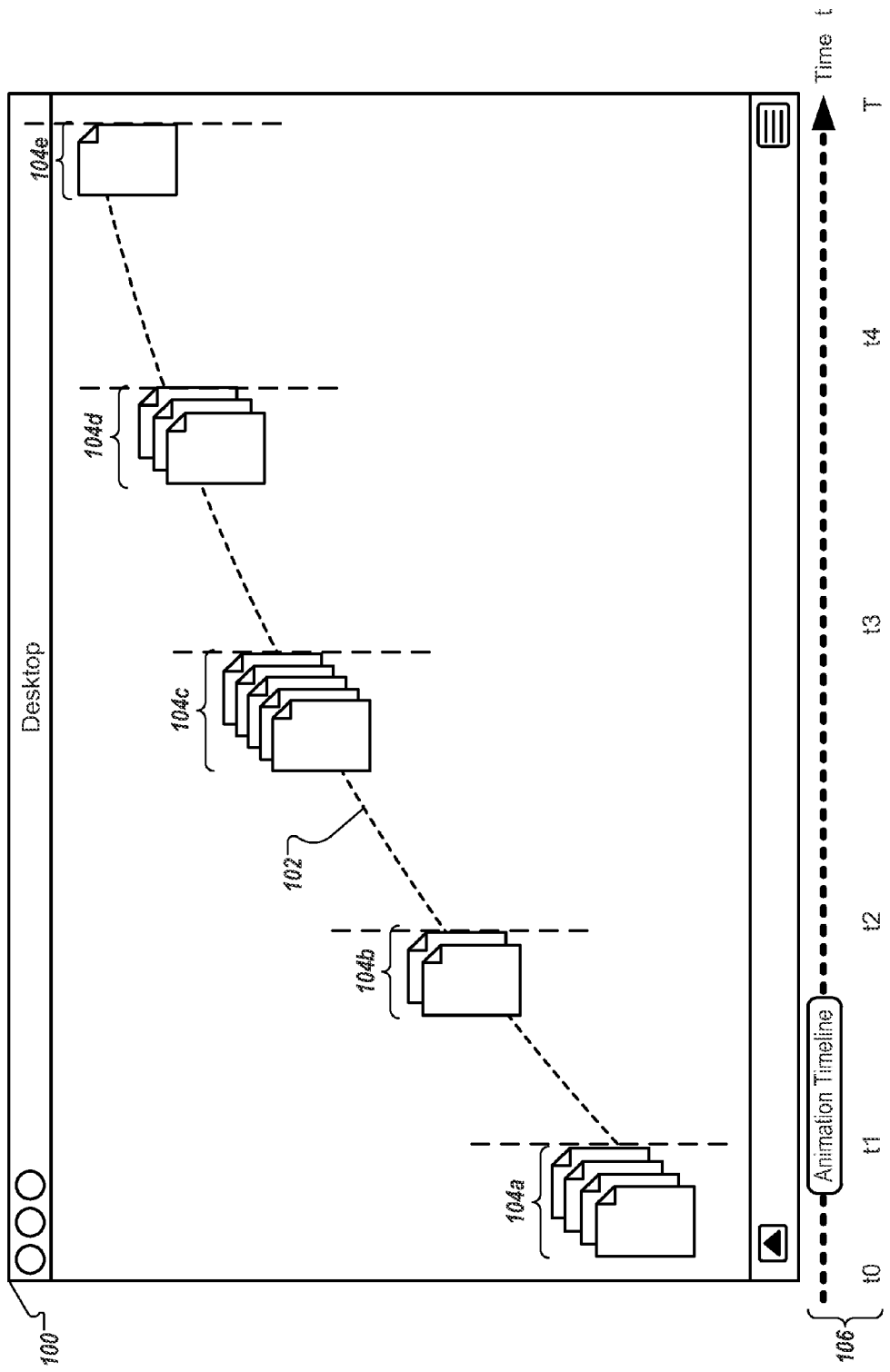

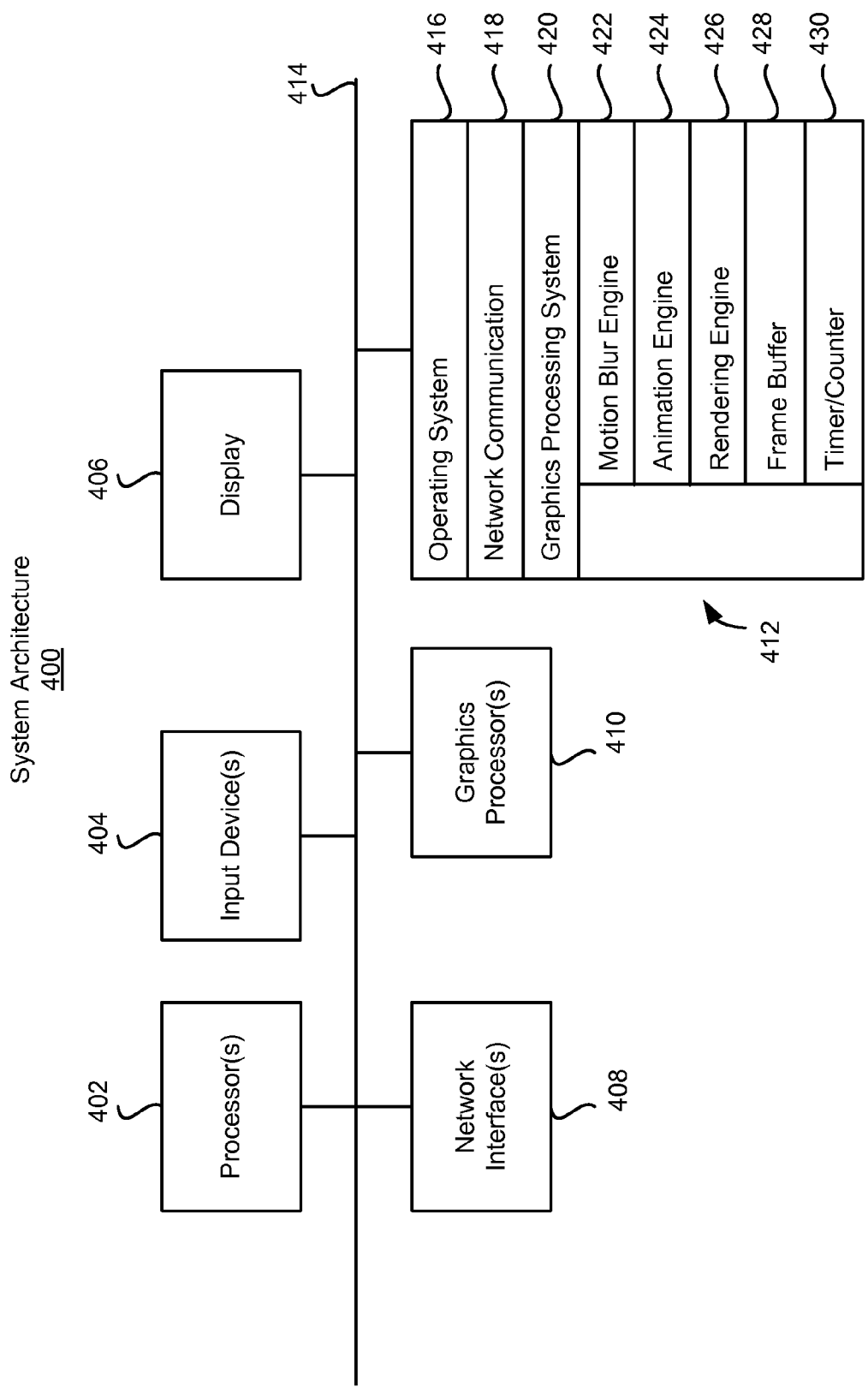

IMAGE MOTION BLURRING

CROSS-REFERENCE TO RELATED APPLICATIONS

This application is a continuation of and claims priority to pending U.S. application Ser. No. 13/251,020, entitled "Image Motion Blurring," filed on Sep. 30, 2011, which claims priority to pending U.S. Provisional Application Ser. No. 61/394,722, entitled "Image Motion Blurring", filed on Oct. 19, 2010, the entire contents of each of which are incorporated herein by reference.

TECHNICAL FIELD

This subject matter is related generally to processing object images for animation sequences.

BACKGROUND

An object displayed in a graphical user interface can be animated. One common animation technique is to move the object along a motion path in the user interface. To create the appearance of motion, a graphics processing system renders frames of the object at different positions along the motion path. If enough frames are rendered, the object will appear to be in motion. The human eye, however, can perceive gaps between individual frames which can make the motion of the object appear choppy. More frames can be added to an animation to make the animation appear smoother. In many applications, however, there may be insufficient time or resources to render the additional frames.

SUMMARY

The disclosed systems and methods make the motion of an object in an animation appear smooth by blending a number of subframes of visually adjusted images of the object for each frame of the animation. In some implementations, a request to animate an object along a motion path is received by a graphics processing system of a device, where the motion path traverses at least a portion of a user interface presented on a display of the device. Responsive to the request, and for each frame of the animation, the graphics processing system blends N subframes of visually adjusted images of the object to create a final blurred image which is rendered on the display. In some implementations, the graphics processing system can determine whether there is more processing time to perform additional blending prior to rendering a frame, and then blending more subframes of images prior to rendering the final frame for display.

BRIEF DESCRIPTION OF THE DRAWINGS

FIGS. 1A-1C illustrate image motion blurring for an animation on a user interface.

FIG. 4 is a schematic diagram of an example hardware architecture for an image motion blurring system.

DETAILED DESCRIPTION

Figure 1B:
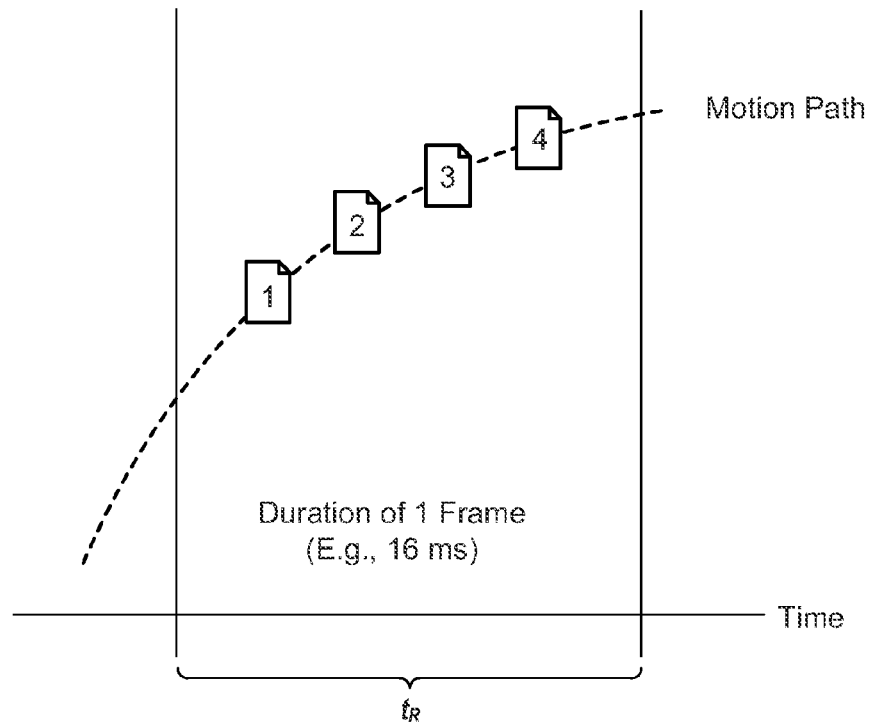

This disclosure describes systems and methods for image motion blurring where subframes of visually adjusted images of an object are blended to produce a blurred image of the object, which can be rendered as a frame in an animation. The use of blended subframes to produce a blurred image can reduce the "choppy" or "strobe" effect that may occur when using non-blurred images. Image motion blurring can be used for a variety of animations, including but not limited to moving objects (e.g., icons, files, documents) along motion paths on user interfaces and minimizing or maximizing user interface elements (e.g., windows).

Image motion blurring can use any number of visually adjusted images to produce a final blurred image to be rendered on a display. Image motion blurring can be iteratively repeated for as long as time remains to prepare an image frame for rendering on a display. For example, if some frame processing time remains before rendering the final frame of the blurred image, additional blending can be performed to create a final blurred image which when included in the animation can result in the appearance of smoother object motion.

Image Motion Blurring

FIG. 1A illustrates image motion blurring. An object (e.g., a document icon) is shown at different locations on a motion path 102 traversing a graphical user interface 100. The user interface 100 can appear on a display device capable of displaying animation, including but not limited to a personal computer, mobile phone, electronic tablet, media player, etc. For discussion purposes only, the animation sequence shown in FIG. 1A includes five blurred images 104a-e, which are rendered at times $t_1$, $t_2$, $t_3$, $t_4$ and T, respectively. The animation is T seconds long (e.g., 1-2 seconds), as indicated by animation timeline 106. In practice, a typical animation would include more than five frames (e.g., 60 frames/second).

The animation is a sequence of blurred images produced by a graphics processing system. For each frame of the animation displayed at a point on the motion path 102, multiple visually adjusted subframe images of the object can be blended to produce a final rendered blurred image, which can be displayed at that point on the motion path 102. For instance, the blurred image 104a is rendered at time $t_1$, the blurred image 104b at time $t_2$, the blurred image 104c at time $t_3$, the blurred image 104d at time $t_4$, and the blurred image 104e at time T. The time T can be the total duration of the animation. In practice, the amount of time available to render a frame of animation at a given point on the motion path 102 can change from frame to frame and among different animations based on the computing resources available at the time of rendering. An advantage of the disclosed image motion blurring is that the number of subframe images blended is dynamically adjusted based on the amount of time available for rendering a blurred image frame.

Time $t_0$ in the animation timeline 106 represents the time that the animation starts, or the time at which the animation is requested. For example, a request to start an animation of a given object can be triggered at $t_0$ when the user interacts with the object in some manner (e.g., closing the document). A graphics processing system can interpret the interaction as a request to perform an animation on the object. In general, the graphics processing system can automatically determine when to use image motion blurring in an animation rather than a conventional animation using non-blurred images. In some implementations, the animation request can identify the starting and ending point (e.g., pixel locations in two dimensions) of a user interface or other display area where the animation is to occur. The animation request can also identify the shape of the motion path 102, such as a straight line, curved arc or any other desired motion path 102.

Each of the blurred images 104a-104e of the object represents a separate frame of the animation. Each of the blurred images 104a-104e can be generated by blending multiple subframes of visually adjusted images of the object. During the blending, the graphics processing system can adjust one or more visual properties of the object image, such as color, opacity, size, shape, rotation, brightness, etc. Each subframe used in the blending can contain an image that has different visual properties then images of other subframes. The adjusting of visual properties creates the blurring effect. For example, one or more colors or the opacity of each subframe image can be reduced by a percentage from the original image properties before being blended with the other subframes. A greater number of subframes blended for each final rendered blurred image in the animation generally results in a smoother looking animation.

The number of subframes to be blended can vary for each blurred image 104a-104e. For example, the blurred image 104a is made up of four blended subframes. These subframe images can be blended over a frame duration tR. The final blurred image, or blurred image 104e, is depicted as being made up of a single subframe, or simply a non-blurred image of the object. This can be the case, for example, if the object is stationary (not moving) during a portion of the animation, such as the start or end of an animation where a non-blurred image would be expected.

In some implementations, the number of subframes that can be blended for any particular blurred image 104a-104e can depend on the frame duration $t_R$ available for the graphics processing system to render a frame in the animation sequence. For example, after the blurred image 104b is rendered at time $t_2$, but before the blurred imaged is rendered at time $t_3$, the frame duration available to the processor can allow the blurred image 104c to be blended from a composite of five subframes (as shown). In some implementations, after some initial blending occurs, the graphics processing system can check the time available for preparing the frame (e.g., by checking a system clock) and then determine an additional number of subframes M that can be blended to generate the final blurred image 104c.

In some implementations, the graphics processing system can make use of previous blending calculations to improve efficiencies of blending additional subframe images. For example, if two subframe images are blended to generate final blurred image 104b, each subframe image can contribute 50% in color to the final blurred image 104b to create the blurred effect. If a third subframe image is to be blended, the graphics processing system can decide not to re-blend the first two subframe images again. Rather, the third subframe image can be blended with the current blend in the frame buffer and the color contributions of the three subframe images can be adjusted accordingly. For example, if four subframe images are to be blended, the graphics processing system can copy the original object image A at 100% to the frame buffer, then blend a subframe image B 50% over the frame buffer, then blend an subframe image C 33% over the frame buffer, then blend an subframe image D 25% over the frame buffer, and so on. Doing so can result in equal contributions from each subframe image to the final blurred image in the frame buffer without having to re-blend previously blended subframe images.

Figure 1C:
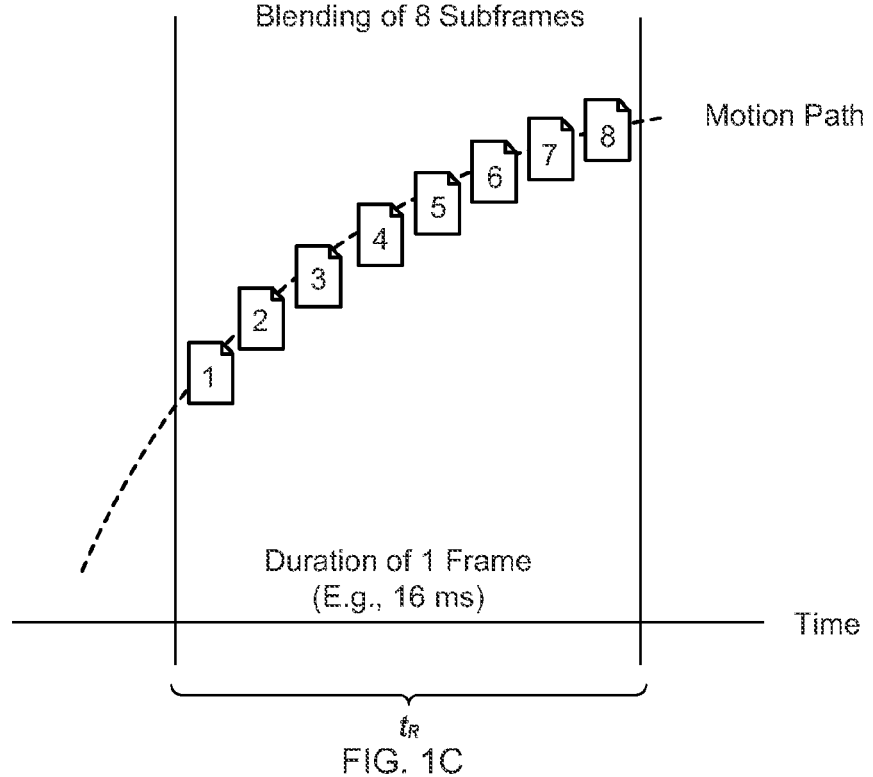

FIGS. 1B and 1C illustrate the blending of 4 subrame images and 6 subframe images, respectively, by dividing proportionally the frame duration tR. Referring to FIG. 1B, the system determines that there is enough time in the frame duration to blend 6 subframe images. Referring to FIG. 1C, the system determines that there is enough time in the frame duration to blend 8 subframe images. As shown in FIGS. 1B and 1C, the frame duration is subdivided proportionally to allow for blending of multiple two or more subframe images (e.g., 4 or 8 images in these examples) of the animated object (e.g., document icon) at different positions on the motion path. The resulting blended image is then rendered in a buffer for display as a blurred image.

Example Processes for Image Motion Blurring

Figure 2:
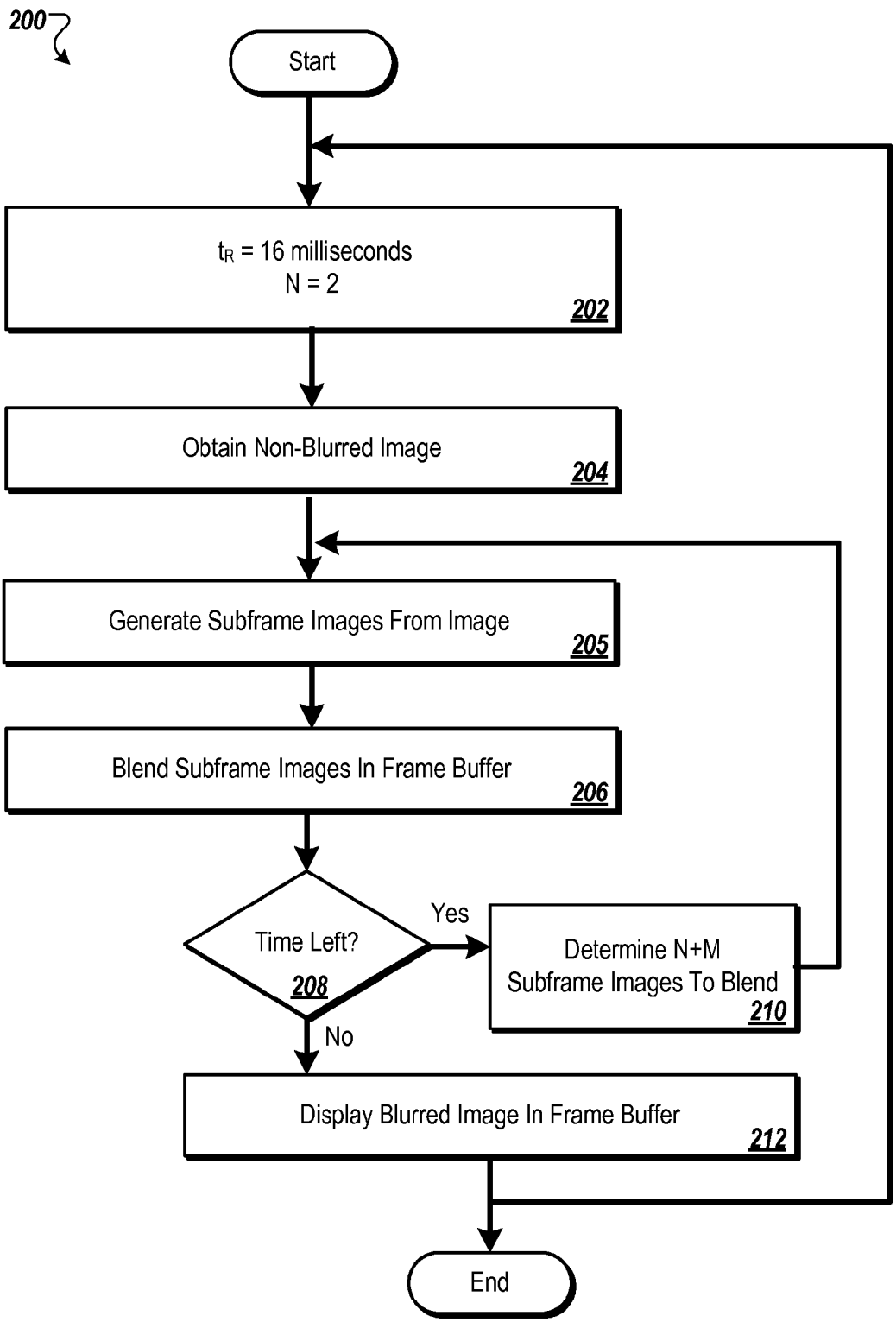
FIG. 2 is a flow diagram of an example process for blending images to achieve an image motion blurring effect.

FIG. 2 is a flow diagram of an example process 200 for blending subframe images to achieve an image motion blurring effect. The process 200 is described with respect to a graphics processing system and the animation, described with reference to FIG. 1. As will be described, steps of the process 200 are repeatable, for example, for each blurred image 104a-104e in the animation.

Process 200 can be invoked when a user interacts with an object on a user interface. Alternatively, process 200 can be invoked automatically by an application or operating system in response to a trigger event. In some implementations, process 200 begins when parameters are initialized for a particular blurred image to be rendered (202). Specifically, the parameters can include: 1) the time initially available to render the current frame of the animation (e.g., $T_R$=16 milliseconds); and 2) an initial number N (e.g., N=2) of subframe images to blend for the current blurred image or the current frame of the animation at a given position along the motion path. As an example, referring to FIG. 1A, the parameters listed here can be initialized for each of the blurred images 104a-104e of the animation. Depending on the processing resources available and the time of animation, each of the blurred images 104a-104e can potentially get a new value for $T_R$ (e.g., $T_R$<16 ms) in which the graphics processing system can iteratively blend subframe images into a final blurred image, ideally as many subframes as time will allow, before the final blurred image is displayed. In some implementations, additional parameters can be initialized in this step of the process 200, such as other parameters involving computer time or other resources.

A non-blurred image of the object is obtained (204). For example, when the graphics processing system receives a request for an animation (e.g., to animate an object in motion across the user interface 102), the graphics processing system can obtain an image of the object from a frame buffer or other repository. The frame buffer can contain the current state of the image that is waiting to be rendered at the next rendering event in the animation (e.g., at a time $t_1$, $t_2$, etc.).

N subframe images are generated from the non-blurred image (205). The N subframe images can be generated by adjusting one or more visual properties of the non-blurred image of the object, such that each subframe image contributes a percentage of a visual property (e.g., color, opacity) to the resulting blurred image to be displayed. Alternatively, a known blurring algorithm can be applied to the non-blurred image to create a blurred image in the frame buffer that can be rendered for display without performing steps 205 through 210.

N subframe images are blended in frame buffer (206). For example, during the first pass through the process 200, N can be 2, meaning two subframes images are blended. In subsequent iterations of the process 200 additional sub-frame can be blended in the frame buffer producing a blurred image in the frame buffer.

A determination is made whether time remains to perform more blending before rendering of the blurred image in the frame is to occur (208). For example, each blending step 206 can take time away from the original allotted time before rendering (e.g., initially 16 milliseconds). The determination can predict how much time would be needed to perform another blending iteration, and the predicted blending time can be compared to the remaining time before rendering. In some implementations, the graphics processing system can factor in the current load on the computer system, such as if other processes have recently started that are draining computer resources (e.g., CPU time, etc.). In other implementations, the determination made in this step can be a simple one, conservatively estimating that it takes x milliseconds (worse case) to perform an average blending iteration.

If adequate time remains to perform an additional blending, the number of subframe images to be blended is incremented by M (210), where M is a positive integer representing the number of additional subframe images to be blended. The number of subframe images to be blended is incremented in anticipation of repeating the step (206) for the next blending iteration. The number of subframe images to be blended can also be used to determine the percentage contribution of one or more visual properties of each subframe image in the blend. For example, if there are 4 subframe images, then the percentage contribution of each subframe image is 25%.

If adequate time does not remain to perform an additional blending, the blurred image in the frame buffer is displayed (212). For example, the display can result in drawing one of the blurred images 104a-104e on the screen 102. If this is the first pass through the process 200, for example, the blurred image 104a is displayed. Because FIG. 1A indicates that the blurred image 104a is blended from four subframe images, the rendered image in the frame buffer is based on three iterations through the step 206 above.

Once the blurred image is displayed (212), the process 200 can repeat for other blurred images 104b-104e in the animation. For example, step 202 of the process 200 can reinitialize the parameters for process 200 steps involving the blurred image 104b. In this case, because FIG. 1 indicates that the blurred image 104b is blended from two subframes images, only one iteration of the step 206 described above is performed, as the determination in step 208 is false or "No" (e.g., no time remains to perform any additional subframe image blending for the blurred image 104b).

The process 200 can be repeated as needed over the duration of the animation (over time T). For example, as depicted in FIG. 1A, the animation includes five blurred images 104a-104e, so the process 200 in this example can occur five times, once for each blurred image 104a-104e. Again, in practice many more frames would be needed in the animation.

Example Software Architecture

Figure 3:
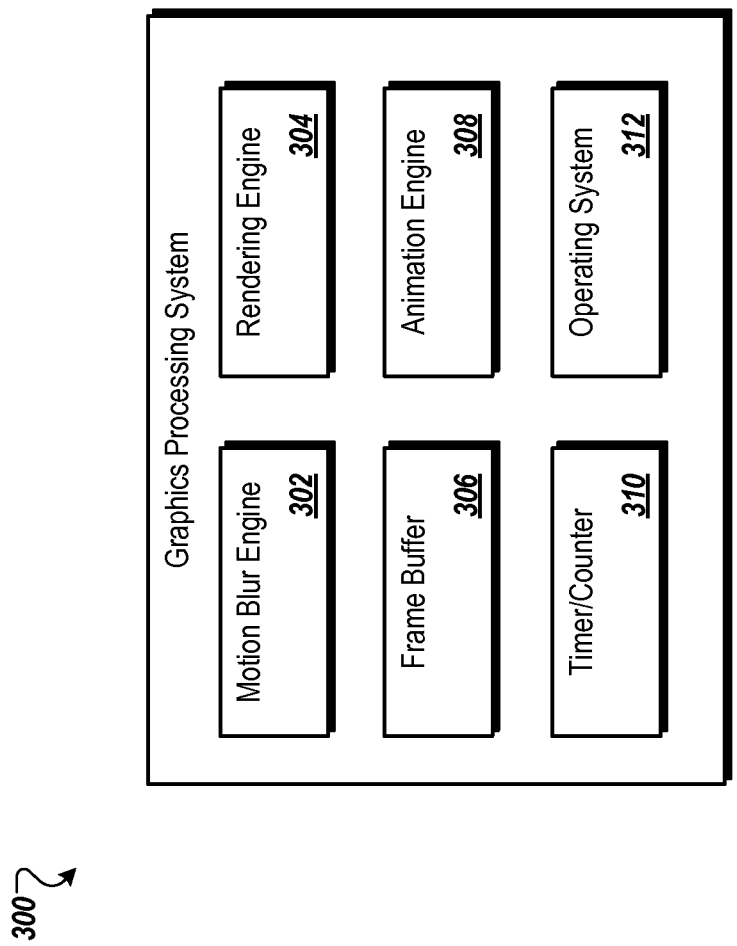
FIG. 3 is a block diagram of an example software architecture for an image motion blurring system.

FIG. 3 is a block diagram of an example graphics processing system 300 for implementing image motion blurring. In some implementations, the system 300 can be used to create animations using image motion blurring, such as the animation described with reference to FIG. 1. The system 300 can be part of a personal computer operating system, part of an application, or both. Alternatively, the system 300 can be implemented as service that is accessible through an Application Programming Interface (API).

Within the system 300, a motion blur engine 302 can communicate with a rendering engine 304. The motion blur engine 302, for example, can create blurred images from two or more individual subframe images using process 200, as described in reference to FIG. 2. The blurred images, such as blurred images 104a-104e, can then be rendered by the rendering engine 304. For instance, the blurred images 104a-104e can provide the animation that the user sees on the user interface 102 that shows a document object in motion across the user interface 102. In general, the rendering engine 304 can render any content on the user interface 102, including blurred images as well as non-blurred images, text, and other displayable components of the graphical user interface 102.

The system 300 can include a frame buffer 306 in communication with an animation engine 308. The frame buffer 306 can contain, at any given time, the final blurred image to be displayed at the next frame rendering event. For example, as described with reference to the process 200 in FIG. 2, the frame buffer 306 can initially contain the non-blurred image of the object, then a blurred image blended from two subframes images, then a blurred image blended from three subframes and so on. At any one time, the blurred image in the frame buffer 306 can be the most extensively blended image up to that time. The animation engine 308 can use images over time that are available from the frame buffer 306 to create animations, such as the animation depicted in FIG. 1.

The animation engine 308 can communicate with a timer/counter 310, which can initialize and maintain timers and the subframe counter (e.g., N described above). More specifically, as the animation engine 308 performs repeated iterations of blending multiple sub frames images into a final blurred image for rendering, the timer/counter 310 can keep track of the time used as well as the time remaining until the final blurred image is to be rendered. At the same time, the timer/counter 310 can maintain a subframe counter. For example, the timer/counter 310 can handle initializations of timer and subframe counter variables for the process 200, as described above with reference to FIG. 2.

The graphics processing system 300 can include, and communicate with, an operating system 312. For example, the operating system 312 can provide access to various operating system-level services, such as graphics functions, kernel-level commands and procedures, device specific parameters (e.g., screen size, etc), and so on.

Example Hardware Architecture

FIG. 4 is a schematic diagram of an example hardware architecture 400 for an image motion blurring system. The architecture 400 can be implemented on any electronic device that runs software applications derived from compiled instructions, including without limitation personal computers, servers, smart phones, media players, electronic tablets, game consoles, email devices, etc. In some implementations, the architecture 400 can include one or more application processors 402, one or more graphics processors 410, one or more network interfaces 408, one or more input devices 404, one or more display devices 406, and one or more computer-readable mediums 412. Each of these components can be coupled by bus 414.

Display device 406 can be any known display technology, including but not limited to display devices using Liquid Crystal Display (LCD) or Light Emitting Diode (LED) technology. Graphics processors 410 can use any known graphics processor technology, including but are not limited to NVIDIA™ GeForce™ processor technology. Input device 404 can be any known input device technology, including but not limited to a keyboard (including a virtual keyboard), mouse, track ball, and touch-sensitive pad or display. Bus 414 can be any known internal or external bus technology, including but not limited to ISA, EISA, PCI, PCI Express, NuBus, USB, Serial ATA or FireWire. Computer-readable medium 412 can be any medium that participates in providing instructions to processors 402 for execution, including without limitation, non-volatile media (e.g., optical disks, magnetic disks, flash drives, etc.) or volatile media (e.g., SDRAM, ROM, etc.).

Computer-readable medium 412 can include various instructions 416 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 404; sending output to display device 406; keeping track of files and directories on computer-readable medium; controlling peripheral devices (e.g., disk drives, printers, etc.) which can be controlled directly or through an I/O controller; and managing traffic on bus 414. Network communications instructions 418 can establish and maintain network connections (e.g., software for implementing communication protocols, such as TCP/IP, HTTP, Ethernet, etc.).

A graphics processing system 420 can include various instructions that provide graphics capabilities. For example, the graphics processing system 420 can support animations and image motion blurring, as described with reference to FIGS. 1-3. Moreover, the graphics processing system 420 can facilitate the process 200 described with reference to FIG. 2. In some implementations, the graphics processing system 420 can provide the functionality for the graphics processing system 300 described with reference to FIG. 3.

The graphics processing system 420 includes a motion blur engine 422 in communication with an animation engine 424. The motion blur engine 422 can produce blurred images used by the animation engine 424, such as to create animations. The animations can be rendered, frame-by-frame or in any other way, by a rendering engine 426. A frame buffer 428 can contain any image, such as a blurred image that can be rendered as part of the animation, or any non-blurred image used for any other reason. A timer/counter 430 included in the graphics processing system 420 can maintain counters (e.g., the number of subframe images used in a given blend, etc.) and timers (e.g., how much time is remaining before rendering a blurred image is to occur).

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, e.g., one or more modules of computer program instructions encoded on a computer readable medium for execution by, or to control, the operation of, data processing apparatus. The computer readable medium can be a machine-readable storage device, a machine-readable storage substrate, a memory device, or a combination of one or more of them. An apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a request to animate an object along a motion path, the motion path traversing at least a portion of a user interface presented on a display of a device;
responsive to the request, and for each image frame of the object rendered along the motion path:
determining a frame duration $t_R$ available to render the image frame;
blending N subframe images of the object during the frame duration $t_R$, where N is a positive integer and each subframe consumes a $t_R/N$ portion of the frame duration $t_R$, and the blending includes adjusting at least one visual property of each subframe prior to blending;
determining if there is enough time left in the frame duration $t_R$ to render more than N subframes images of the object;
determining that N+M subframe images of the object can be blended during the frame duration $t_R$, where M is a positive integer;
blending N+M subframe images of the object during the frame duration $t_R$, where each subframe image consumes a $t_R/(N+M)$ portion of the frame duration $t_R$, and the blending includes adjusting at least one visual property of each subframe prior to blending;
determining that there is no time left in the frame duration $t_R$ to render more than N+M subframe images of the object; and
displaying the blended N+M subframe images of the object as the rendered frame image on the motion path within the frame duration $t_r$.

2. The method of claim 1, where the request is made in response to a user interaction with the object on the user interface.

3. The method of claim 1, where the request is made by an application or operating system in response to a trigger event.

4. The method of claim 1, where the at least one visual property is color, opacity, size, shape, rotation, position or brightness.

5. The method of claim 1, where the at least one visual property of at least one subframe image is adjusted to contribute a percentage of the visual property to the blended image.

6. A system for image motion blurring comprising:
a frame buffer;
a processor coupled the frame buffer, the processor programmed for:
receiving a request to animate an object along a motion path, the motion path traversing at least a portion of a user interface presented on a display of a device;
responsive to the request, and for each image frame of the object rendered along the motion path:
determining a frame duration $t_R$ available to render the image frame;
blending N subframe images of the object during the frame duration $t_R$, where N is a positive integer and each subframe consumes a $t_R/N$ portion of the frame duration $t_R$, and the blending includes adjusting at least one visual property of each subframe prior to blending;
determining if there is enough time left in the frame duration $t_R$ to render more than N subframes images of the object;
determining that N+M subframe images of the object can be blended during the frame duration $t_R$, where M is a positive integer;
blending N+M subframe images of the object during the frame duration $t_R$, where each subframe image consumes a $t_R/(N+M)$ portion of the frame duration $t_R$, and the blending includes adjusting at least one visual property of each subframe prior to blending;
determining that there is no time left in the frame duration $t_R$ to render more than N+M subframe images of the object; and
displaying the blended N+M subframe images of the object as the rendered frame image on the motion path within the frame duration $t_R$.

7. The system of claim 6, where the at least one visual property is color, opacity, size, shape, rotation, position or brightness.

8. The system of claim 6, where the at least one visual property of at least one subframe image is adjusted to contribute a percentage of the visual property to the blurred image.

9. A non-transitory computer-readable medium having instructions stored thereon, which, when executed by a processor, causes the processor to perform operations comprising:
receiving a request to animate an object along a motion path, the motion path traversing at least a portion of a user interface presented on a display of a device;
responsive to the request, and for each image frame of the object rendered along the motion path:
determining a frame duration $t_R$ available to render the image frame;
blending N subframe images of the object during the frame duration $t_R$, where N is a positive integer and each subframe consumes a $t_R/N$ portion of the frame duration $t_R$, and the blending includes adjusting at least one visual property of each subframe prior to blending;

determining if there is enough time left in the frame duration $t_R$ to render more than N subframes images of the object;

determining that N+M subframe images of the object can be blended during the frame duration $t_R$, where M is a positive integer;

blending N+M subframe images of the object during the frame duration $t_R$, where each subframe image consumes a $t_R/(N+M)$ portion of the frame duration $t_R$, and the blending includes adjusting at least one visual property of each subframe prior to blending;

determining that there is no time left in the frame duration $t_R$ to render more than N+M subframe images of the object; and displaying the blended N+M subframe images of the object as the rendered frame image on the motion path within the frame duration $t_R$.

10. The computer-readable medium of claim 9, where the at least one visual property is color, opacity, size, shape, rotation, position or brightness.

11. The computer-readable medium of claim 9, where the at least one visual property of at least one subframe image is adjusted to contribute a percentage of the visual property to the blended image frame.

* * * * *

UNITED STATES PATENT AND TRADEMARK OFFICE
CERTIFICATE OF CORRECTION

Page 1 of 1

PATENT NO. : 8,749,560 B2
APPLICATION NO. : 13/475888
DATED : June 10, 2014
INVENTOR(S) : Bas Ording It is certified that error appears in the above-identified patent and that said Letters Patent is hereby corrected as shown below:

In the Claims

Column 9, Line 67, Claim 1; replace:

"the frame duration $t_r$." with

-- the frame duration $t_R$. --

Signed and Sealed this
Eleventh Day of November, 2014

Michelle K. Lee
*Deputy Director of the United States Patent and Trademark Office*